United States Patent
Berke et al.

(10) Patent No.: US 8,954,610 B2
(45) Date of Patent: *Feb. 10, 2015

(54) SYSTEM-WIDE TIME SYNCHRONIZATION ACROSS POWER MANAGEMENT INTERFACES AND SENSOR DATA

(71) Applicant: Dell Products L.P., Round Rock, TX (US)

(72) Inventors: Stuart Allen Berke, Austin, TX (US); George Richards, III, Round Rock, TX (US); Mark Muccini, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,471

(22) Filed: Jul. 10, 2013

(65) Prior Publication Data

US 2013/0311805 A1 Nov. 21, 2013

Related U.S. Application Data

(63) Continuation of application No. 12/840,999, filed on Jul. 21, 2010, now Pat. No. 8,489,775.

(51) Int. Cl.
   *G06F 15/16* (2006.01)
   *G06F 1/12* (2006.01)
   *G06F 1/32* (2006.01)

(52) U.S. Cl.
   CPC *G06F 1/12* (2013.01); *G06F 1/324* (2013.01); *G06F 2213/0038* (2013.01)
   USPC ........... 709/248; 709/226; 709/228; 370/476; 370/503

(58) Field of Classification Search
   CPC .... G06F 1/12; G06F 1/324; G06F 2213/0038
   USPC .......................... 709/248, 226; 370/476–503
   See application file for complete search history.

(56) References Cited

U.S. PATENT DOCUMENTS

| | | |
|---|---|---|
| 5,602,992 A | 2/1997 | Danneels |
| 6,981,061 B1 | 12/2005 | Sakakura |
| 6,981,063 B1 | 12/2005 | Eggers et al. |
| 7,010,708 B2 | 3/2006 | Ma |
| 7,197,441 B2 | 3/2007 | Lee et al. |
| 7,649,910 B1 | 1/2010 | Wechsler et al. |
| 7,962,448 B2 | 6/2011 | Creamer et al. |
| 8,018,954 B2 | 9/2011 | Jamieson et al. |

(Continued)

OTHER PUBLICATIONS

RFC 778, DCNET Internet Clock Service, D.L. Mills, COMSAT Laboratories, Apr. 18, 1981, available at http://tools.ietf.org/pdf/rfc778.pdf.

(Continued)

*Primary Examiner* — Razu Miah
(74) *Attorney, Agent, or Firm* — Baker Botts L.L.P.

(57) ABSTRACT

A power management control system for an information handling system is disclosed. The power management control system includes a power management interface bus interfacing a plurality of devices, where one or more of the devices is each associated with a time clock. The power management control system further includes a management agent interfacing the power management interface bus. The management agent is configured to: receive a system time; synchronize the one or more time clocks based, at least in part, on the system time; and maintain synchronization of the one or more time clocks, at least in part, via a set of telemetric primitives.

9 Claims, 6 Drawing Sheets

(56) References Cited

U.S. PATENT DOCUMENTS

| | | | |
|---|---|---|---|
| 8,078,762 B2 | 12/2011 | Kitz et al. | |
| 8,214,682 B2 | 7/2012 | Vaidyanathan et al. | |
| 8,380,662 B2 | 2/2013 | Schneider | |
| 2002/0114356 A1* | 8/2002 | Morita et al. | 370/503 |
| 2002/0129290 A1 | 9/2002 | Couillard | |
| 2003/0217153 A1* | 11/2003 | Rao et al. | 709/226 |
| 2004/0223515 A1* | 11/2004 | Rygielski et al. | 370/503 |
| 2006/0056459 A1 | 3/2006 | Stratton et al. | |
| 2006/0059270 A1* | 3/2006 | Pleasant et al. | 709/237 |
| 2006/0069809 A1* | 3/2006 | Serlet | 709/248 |
| 2006/0072619 A1* | 4/2006 | Geer | 370/476 |
| 2006/0129864 A1* | 6/2006 | Kynast et al. | 713/375 |
| 2006/0224775 A1* | 10/2006 | Lee et al. | 709/248 |
| 2007/0014269 A1 | 1/2007 | Sherman et al. | |
| 2007/0033294 A1* | 2/2007 | Ungermann et al. | 709/248 |
| 2007/0091933 A1* | 4/2007 | Chelstrom et al. | 370/503 |
| 2007/0219751 A1 | 9/2007 | Huang | |
| 2008/0195759 A1* | 8/2008 | Novik et al. | 709/248 |
| 2009/0086763 A1* | 4/2009 | Kopetz et al. | 370/498 |
| 2009/0149221 A1 | 6/2009 | Liu et al. | |
| 2010/0030916 A1 | 2/2010 | Greenwood Graham | |
| 2010/0268849 A1* | 10/2010 | Bengtson et al. | 709/248 |
| 2011/0118894 A1 | 5/2011 | Reineccius et al. | |

OTHER PUBLICATIONS

RFC 891, DCN Local-Network Protocols, D.L. Mills, COMSAT Laboratories, Dec. 1983, available at http://tools.ietf.org/pdf/rfc891.pdf.

RFC 956, Algorithms for Synchronizing Network Clocks, D.L. Mills, Sep. 1985, available at http://tools.ietf.org/pdf/rfc956.pdf.

RFC 1305, Network Time Protocol (Version 3) Specification, Implementation and Analysis, D.L. Mills, Mar. 1992, available at http://tools.ietf.org/pdf/rfc1305.pdf.

RFC 1361, Simple Network Time Protocol (SNTP), D.L. Mills, Aug. 1992, available at http://tools.ietf.org/pdf/rfc1361.pdf.

RFC 1769, Simple Network Time Protocol (SNTP), D.L. Mills, Mar. 1995, available at http://tools.ietf.org/pdf/rfc1769.pdf.

RFC 2030, Simple Network Time Protocol (SNTP) Version 4 for IPv4, IPv6 and OSI, D.L. Mills, Oct. 1996, available at http://tools.ietf.org/pdf/rfc2030.pdf.

RFC 4330, Simple Network Time Protocol (SNTP) Version 4 for IPv4, IPv6 and OSI, D.L. Mills, Jan. 2006, available at http://tools.ietf.org/pdf/rfc4330.pdf.

RFC 867, Daytime Protocol, J. Postel, May 1983, available at http://tools.ietf.org/pdf/rfc867.pdf.

RFC 868, Daytime Protocol, J. Postel, May 1983, available at http://tools.ietf.org/pdf/rfc868.pdf.

Levine, "An Algorithm to Synchronize the Time of a Computer to Universal Time", IEEE/ACM Transactions of Networking, vol. 3, No. 1, Feb. 1995, available at http://tf.boulder.nist.gov/general/pdf/1064.pdf.

Ping et al. (Delay Measurement Time Synchronization for Wireless Sensor Networks, Su Ping, IRB-TR-03-013 Intel Research Berkeley, Jun. 2003).

* cited by examiner

| MAG. | COUNT | | | | | | | | | | | | | |
|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |

HIGH-PRECISION DELTA TIME FORMAT

MAGNITUDE:
00=NANOSECONDS
01=MICROSECONDS
10=MILLISECONDS
11=SECONDS

COUNT:
0 TO 8191

| MAG. | COUNT | | | | | |
|---|---|---|---|---|---|---|
| 7 | 6 | 5 | 4 | 3 | 2 | 1 | 0 |

COMPACT DELTA TIME FORMAT

MAGNITUDE:
00=PRE-ESTABLISHED TIMEBASE
01=TENS OF TIMEBASE
10=HUNDREDS OF TIMEBASE
11=THOUSANDS OF TIMEBASE

COUNT:
0 TO 63 UNITS

WHERE TIMEBASE=NANOSECONDS/MICROSECONDS/MILLISECONDS/SECONDS

*FIG.5D*

SYSTEM-WIDE TIME SYNCHRONIZATION ACROSS POWER MANAGEMENT INTERFACES AND SENSOR DATA

CROSS REFERENCES TO RELATED APPLICATIONS

This application is a continuation application of U.S. patent application Ser. No. 12/840,999 entitled "System-wide Time Synchronization Across Power Management Interfaces and Sensor Data" which was filed on Jul. 21, 2010 and is incorporated herein by reference in its entirety for all purposes.

TECHNICAL FIELD

The present disclosure relates generally to information handling systems and, more particularly, to systems and methods for system-wide time synchronization across power management interfaces and sensor data.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

As power consumption and power management become further developed, there is a greater need for incorporating sensor sample temporal data within the system power management control system, and eventually across multiple systems. In recent years, polling of sensor data was only required in the low seconds to enable early usage models such as: long-term average system power consumption; power capping/throttling for thermal management; or power capping to a long-term average ceiling. Tight temporal coordination of control and telemetry was not required.

More recent usage models—such as power capping to a PSU (power supply unit) current output limit, power capping to an external circuit breaker or PDU (power distribution unit), enhanced performance per watt optimization, among others—require sensor data polling in the tenths of seconds. Example control systems may read power sensors up to 10 Hz, DIMM (dual in-line memory module) thermal sensors up to 8 Hz, and may adjust system performance states at up to 4 Hz. These usage models require only loose coordination of control and telemetry, which is assumed to be much faster than the polling rate and control loop time.

However, next generation usage models may require control and telemetry in the 100s to 1000s Hz or more, where it may become critical that the power- and thermal-related sensor data be time-correlated across various subsystems (PSUs, voltage regulators, thermal sensors, etc.). Current state-of-the-art power management buses, interfaces, and methods do not provide the required timestamp and time-correlation methods to support these usage models.

SUMMARY

The present disclosure relates generally to information handling systems and, more particularly, to systems and methods for system-wide time synchronization across power management interfaces and sensor data.

In one aspect, a power management control system for an information handling system is disclosed. The power management control system includes a power management interface bus interfacing a plurality of devices, where one or more of the devices is each associated with a time clock. The power management control system further includes a management agent interfacing the power management interface bus. The management agent is configured to: receive a system time; synchronize the one or more time clocks based, at least in part, on the system time; and maintain synchronization of the one or more time clocks, at least in part, via a set of telemetric primitives.

In another aspect, a method for providing a power management control system for an information handling system is disclosed. The method includes: providing a power management interface bus interfacing a plurality of devices, where one or more of the devices is each associated with a time clock; providing a management agent interfacing the power management interface bus, where the management agent is configured to receive a system time; synchronizing the one or more time clocks based, at least in part, on the system time; and maintaining synchronization of the one or more time clocks, at least in part, via a set of telemetric primitives.

In yet another aspect, a method for providing system-wide time synchronization across power management interfaces is disclosed. The method includes: providing a set of primitives to a controller to retrieve and control time information, at least in part, with one or more of the primitives, where the time information is associated with a plurality of devices coupled to a power management interface bus, and where one or more of the devices is each associated with a time clock; and providing a set of telemetric primitives to the controller to synchronize the one or more time clocks based, at least in part, on one or more of the telemetric primitives and timestamp information received via the power management interface bus.

The present disclosure provides for comprehensive time and data synchronization for power management interfaces. Certain embodiments of the present disclosure are directed to a power management domain within an information handling system. Certain embodiments may provide for time-correlation of power- and thermal-related sensor time clocks and data across various subsystems. Certain embodiments may synchronize system time between systems and/or subsystems to very high accuracy and may be extended to synchronize power management sensors beyond a single system. Certain embodiments extend power management interfaces to incorporate an array of commands, primitives, and/or extensions to support an arbitrary level of time synchronization accuracy within the power-managed domains of a system and/or across systems. Certain embodiments contemplate usage models include allocating VMs (virtual machines) to sockets, cores, and/or physical memory based, at least in part, on one or more of real-time subsystem power usage and efficiency points, charge-back of power utilization to a process or VM, fine-grain performance-per-watt optimization, migration of processes and VMs to optimal subsystems, subsystem level power capping, and right-sizing of voltage regulators. Time primitives, data formats, and clock synchronization methods allow power management interfaces to provide highly accurate sensor data time stamping to a system power management agent.

Thus, the present disclosure provides systems and methods for system-wide time synchronization across power management interfaces and sensor data. Other technical advantages will be apparent to those of ordinary skill in the art in view of the specification, claims and drawings.

BRIEF DESCRIPTION OF THE DRAWINGS

A more complete understanding of the present embodiments and advantages thereof may be acquired by referring to the following description taken in conjunction with the accompanying drawing, in which like reference numbers indicate like features.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example without limitation, storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Certain embodiments of the present disclosure are directed to a power management domain within an information handling system (e.g., a server). Certain embodiments may provide for time-correlation of power- and thermal-related sensor time clocks and data across various subsystems. Certain embodiments may synchronize system time between systems and/or subsystems to very high accuracy and may be extended to synchronize power management sensors beyond a single system. Certain embodiments extend power management interfaces to incorporate an array of commands, primitives, and/or extensions to support an arbitrary level of time synchronization accuracy within the power-managed domains of a system and/or across systems. Certain embodiments provide for usage models include allocating VMs (virtual machines) to sockets, cores, and/or physical memory based, at least in part, on one or more of real-time subsystem power usage and efficiency points, charge-back of power utilization to a process or VM, fine-grain performance-per-watt optimization, migration of processes and VMs to optimal subsystems, subsystem level power capping, and right-sizing of voltage regulators. Time primitives, data formats, and clock synchronization methods allow power management interfaces, that may implement industry standard protocol PMBus (Power Management Bus), SMBus (System Management Bus) and others, to provide highly accurate sensor data time stamping to a system power management agent.

Figure 1:
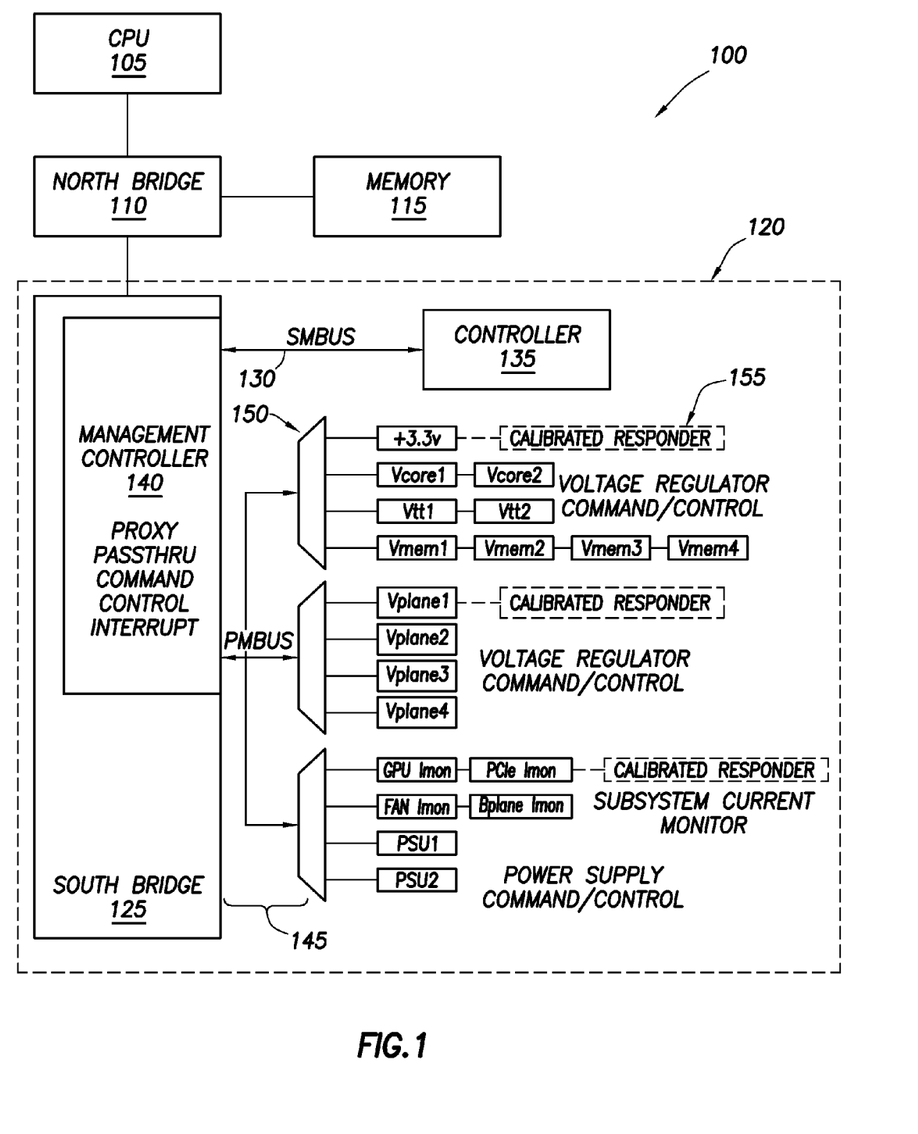
FIG. 1 is a simplified schematic diagram of an information handling system and power management system topology for system-wide time synchronization across one or more power management interfaces, in accordance with certain embodiments of the present disclosure.

FIG. 1 is a simplified schematic diagram of an information handling system 100 and power management system topology 120 for system-wide time synchronization across one or more power management interfaces, in accordance with certain embodiments of the present disclosure. The power management system topology 120 may be implemented in an information handling system or across a plurality of information handling systems. The information handling system 100 may include one or more processors 105 communicatively coupled to memory 115 and a north bridge 110. The north bridge 110 may be communicatively coupled to a south bridge 120. The south bridge 125 may be communicatively coupled via an interface 130 to a controller 135. In certain embodiments, the interface 130 may be a bus according to the SMBus standard. The controller 135 may be or include a systems management hardware and software solution, such as a Baseboard Management Controller (BMC), a Management Engine (ME), or an integral part of a Remote Access Controller.

A management controller 140 may be coupled to controller 135 and operable to provide a proxy pass-through control/interrupt from the controller 135 to one or more power control/status devices 150 via an interface 145. In certain embodiments, an interface 145 such as a bus according the PMBus standard may couple the power control/status devices 150 to one or both of the south bridge 125 and management controller 140. For example without limitation, the power control/status devices 150 may include voltage regulator command/control, power supply command/control, subsystem monitoring/control, and may include any of various power management elements and sensors that may be associated with various subsystems. Example sensors may include AC and DC voltage, current, and power sensors, temperature sensors, fan RPM sensors, etc. In certain embodiments, one of more of the power control/status devices 150 may include calibrated responder devices 155. As disclosed in further detail herein, a calibrated responder device 155 may provide precisely know command and response latency.

Figure 2:
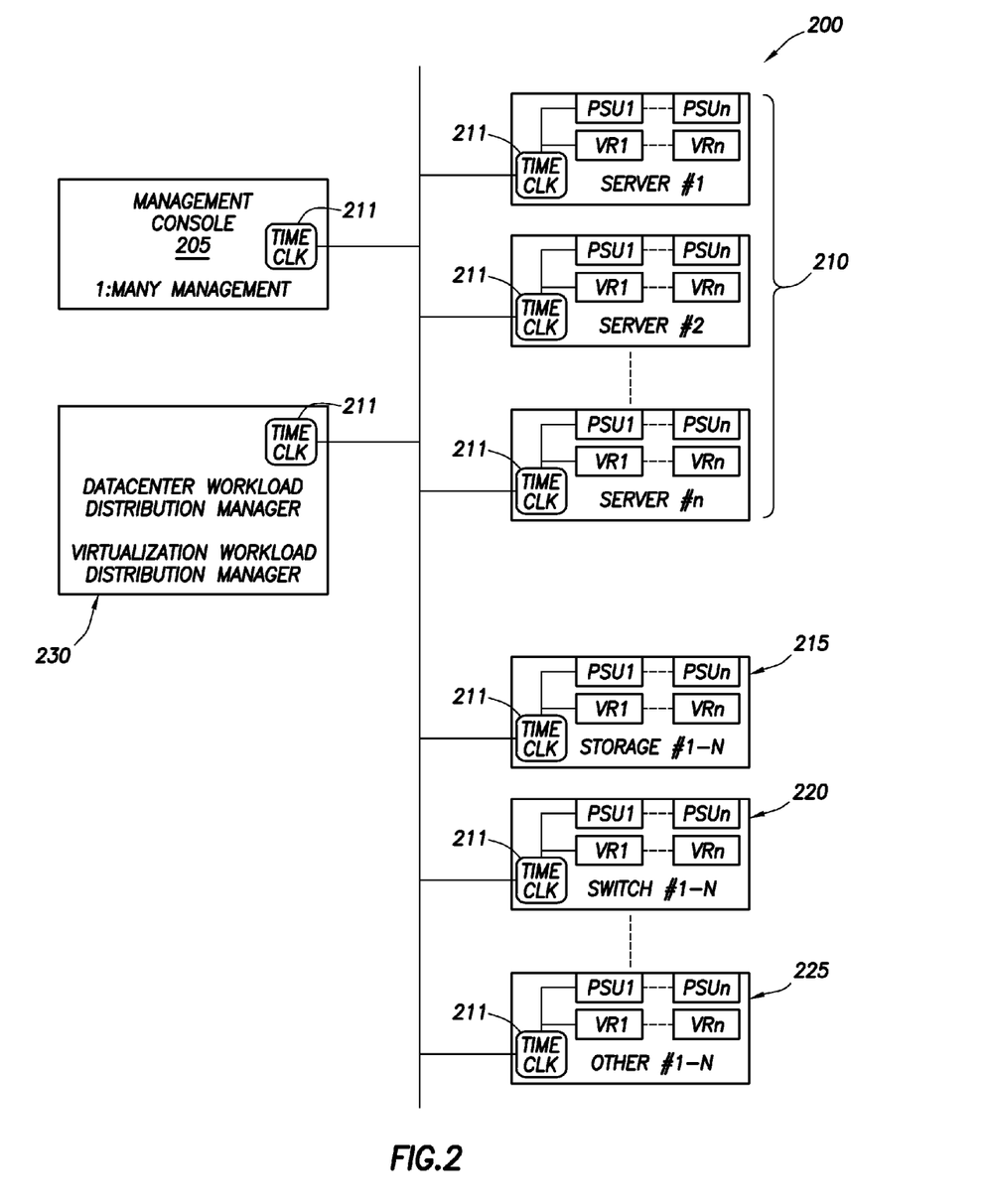
FIG. 2 is a simplified schematic diagram of an example datacenter topology in which certain embodiments of the present disclosure may be implemented to provide system-wide time synchronization across one or more power management interfaces, in accordance with certain embodiments of the present disclosure.

FIG. 2 is a simplified schematic diagram of an example datacenter topology 200 in which certain embodiments of the present disclosure may be implemented to provide system-wide time synchronization across one or more power management interfaces, in accordance with certain embodiments of the present disclosure. A plurality of information handling systems may be housed in a data center, which may include several rows of racks of information handling systems. The information handling systems may include computational units, which provide a computational power that may be distributed across several information handling systems. By way of example, the datacenter topology 200 may include a management console 205 communicatively coupled, with a one-to-many management correspondence, to one or more of servers 210, storage 215, one or more switches 220, and various subsystems 225, each element being associated with an individual time clock and one or more subsystem sensors. A datacenter workload distribution manager and virtualization workload distribution manager, generally indicated at 230, may likewise include an individual time clock and be communicatively coupled to the management console 205 and other elements of the datacenter. By utilizing system-system time synchronization as disclosed herein, simultaneous per-element power management across systems with topologies such as example datacenter topology 200 may be achieved to a high level of accuracy and may allow data-center-wide optimized scheduling of tasks, virtual machines, resources, etc. with synchronized power management clocks and subsystem sensors.

System time may be provided via a counter of 32-64 bits, with resolution in the nanoseconds to milliseconds. A zero count may correspond to a specific date, such as Jan. 1, 1900. Embodiments of the present disclosure do not depend on specific clock implementation, but provide flexibility to maintain one or more synchronized power-managed sensor clocks to the accuracy required for one or more applications.

Moreover, certain embodiments of this disclosure may be used to synchronize system time between systems to very high accuracy. As would be appreciated by one of ordinary skill in the art having the benefit of this disclosure, certain embodiments may be used in conjunction with various industry standard methods to distribute system time across devices on a common network. By way of example, the standards include the following, which are hereby incorporated by reference: ITS (Internet Time Service), NTP (Network Time Protocol, specified in RFC 778, RFC 891, RFC 956, and RFC 1305), GPS (The Global Positioning System), PTP (Precision Time Protocol, per IEEE 1588-2002 and 1588-2008 standards), and various Military Networks standards. Methods according to such standards allow system-system clocks to be maintained to one millisecond or better.

A BIOS (Basic Input/Output System) of an information handling system may transfer a system time, illustrated as TIME CLK 211, on a periodic basis to a systems/power management agent ("management agent") that may utilize one or more controllers and/or management elements. The management agent is typically a firmware or software program executing on controller 135 or on management controller 140 (or CPU 105 or any other suitable element within the information handling system). A management agent time may be synchronized to system/operating system time and then distributed to power control/status devices. This allows any clock drift within a system to be corrected and clocks across multiple systems, and/or elements within a system, to be kept synchronized.

The management agent may initialize, calibrate, and maintain clock time across all power management elements and sensors. By way of example, the following primitives may be provided to facilitate initialization, calibration, and maintenance of clock time synchronization.

- Write Time (absolute) to one (single) or more nodes (e.g., per Broadcast or Group Command protocols)
- Adjust Time by X (relative)
- Read Time (absolute)
- Read Supported Time Base Precision
- Mark Time (causes sensor to snapshot a new time baseline for future telemetry with delta-time)

The primitives disclosed herein may be implemented in user- or manufacturer-defined messages and/or opcodes (operation codes), or eventually be folded into industry standards. For instance, the PMBus standard supports 256 MFR_SPECIFIC_COMMAND_EXT and 256 PMBUS_COMMAND_EXT command set extensions, which allow manufacturers to implement additional commands beyond the standard 256 command codes.

Figure 3:
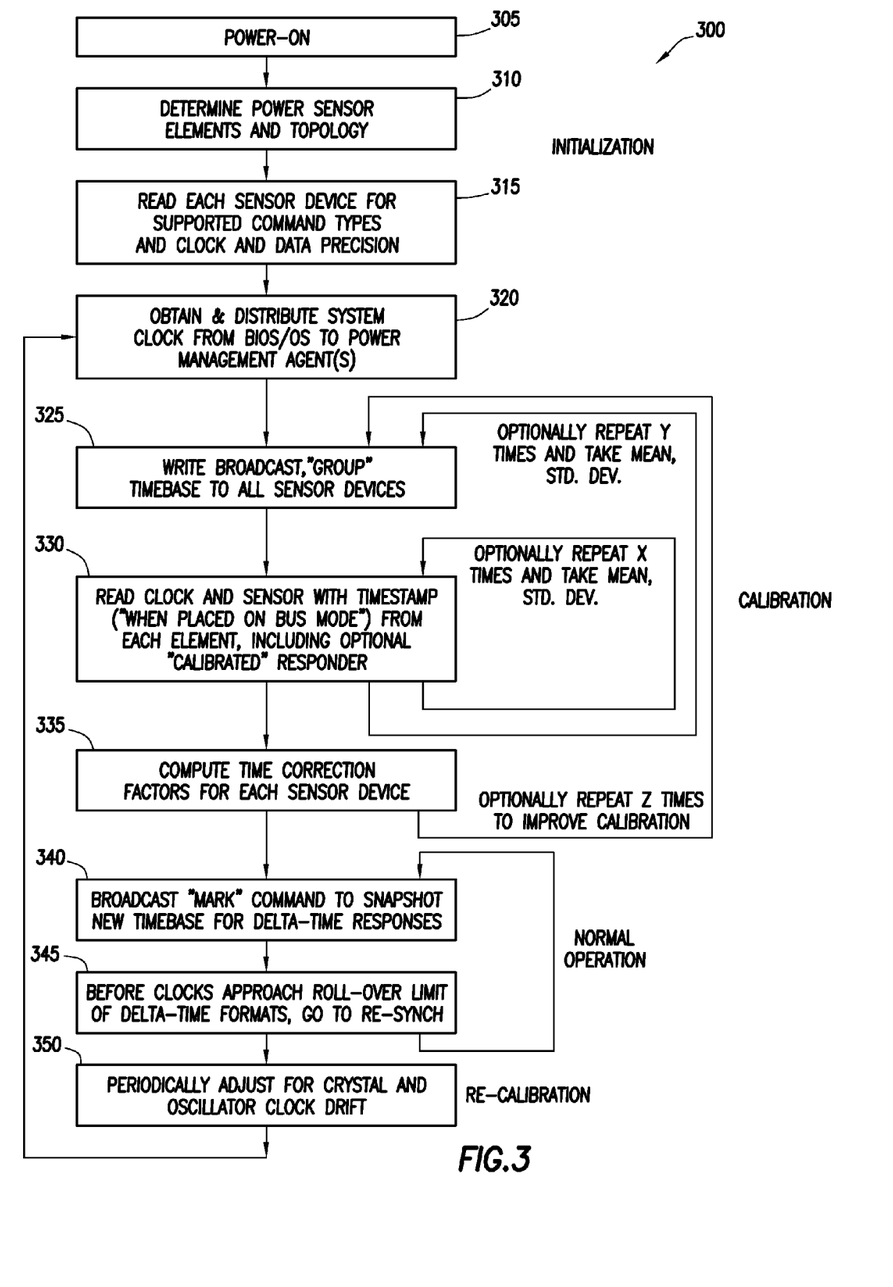
FIG. 3 is a flow chart for one example method of sensor clock initialization, calibration, and operation, in accordance with certain embodiments of the present disclosure.

FIG. 3 shows a flow chart 300 for one example method of sensor clock initialization calibration, and operation, in accordance with certain embodiments of the present disclosure. The system may be powered on at step 305. Initialization may include determining (discovery of) one or more power sensor elements and/or topology at step 310. Initialization may further include reading one or more sensor devices for supported command types, clock, and/or data precision, as indicated at step 315. At step 320, system clock time from BIOS/operating system may be obtained and distributed to one or more management agents.

Calibration may include writing Broadcast/Group time base to one or more sensor devices at step 325. At step 330, calibration may further include reading clock and sensor with timestamp from each element, including "calibrated" responder in certain embodiments. Time correction factors may be computed for one or more sensors device at step 335. In certain embodiments, one or more of steps 325, 330, and 335 may be repeated any suitable number of times to improve calibration based on mean, standard deviation, and/or recomputed time correction factors. Successive approximation may be used, combined with averaging of readings, to obtain arbitrary calibration accuracy. Certain embodiments may use a "Known Good"/"calibrated" responder with known latencies to calibrate other devices on the topology and thereby remove clock uncertainty.

After calibration, the method may transition to normal operation. The normal operation stage may include broadcasting a "Mark" command to snapshot one or more new time bases for delta-time responses, as indicated at step 340. At step 345, before the one or more clocks approach a roll-over limit of delta-time formats, the method may transition to re-synchronization. At step 350, the method may re-calibrate by periodically adjusting for crystal & oscillator clock drift. The method may loop to step 320 for additional iterations.

Thus, the flowchart 300 illustrates one example method of initialization and calibration of that may be applied to various sensor clocks. It should be understood that the example method may be subject to considerable modifications depending on specific implementations. Various algorithms may employ broadcast time and read-back from each device on the topology to cross-calibrate and "triangulate" to determine latencies to be used to null out time.

Once the clocks are synchronized, the following telemetry primitives may be used.

Read parameter with Timestamp When Last Sampled (absolute)

Read parameter with Timestamp When Placed on Bus (absolute)

Read parameter with Delta-Time from Last Mark Time (relative)

Schedule operation or sensor update at X time (relative or absolute)

Figure 4A:
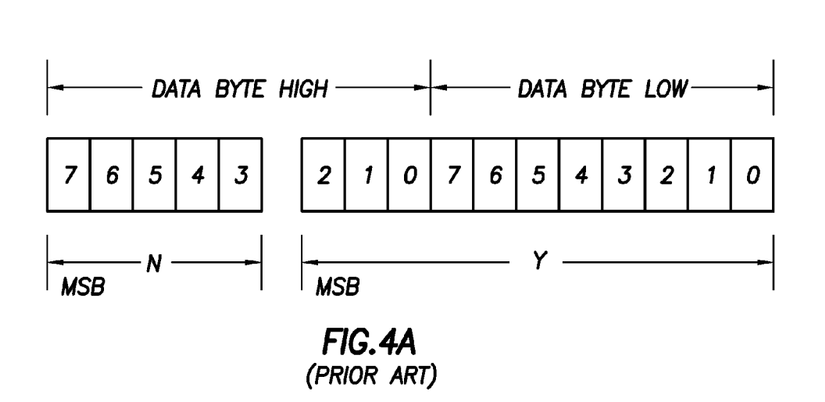
FIGS. 4A and 4B illustrate the prior art linear data format.

Power management buses, such as PMBus standard buses, support general data formats, but these formats are not optimal for minimizing bus bandwidth and latency. As is known in the art, a linear data format in PMBus may be used for commanding and reporting parameters. The linear data format is a two-byte value with an 11-bit, two's complement mantissa and a 5-bit, two's complement exponent (scaling factor). FIG. 4A illustrates the format of the two data bytes, where Y corresponds to the mantissa and N corresponds to the exponent. The "real world" value X may be represented by the equation: $X=Y*2^N$.

Figure 4B:
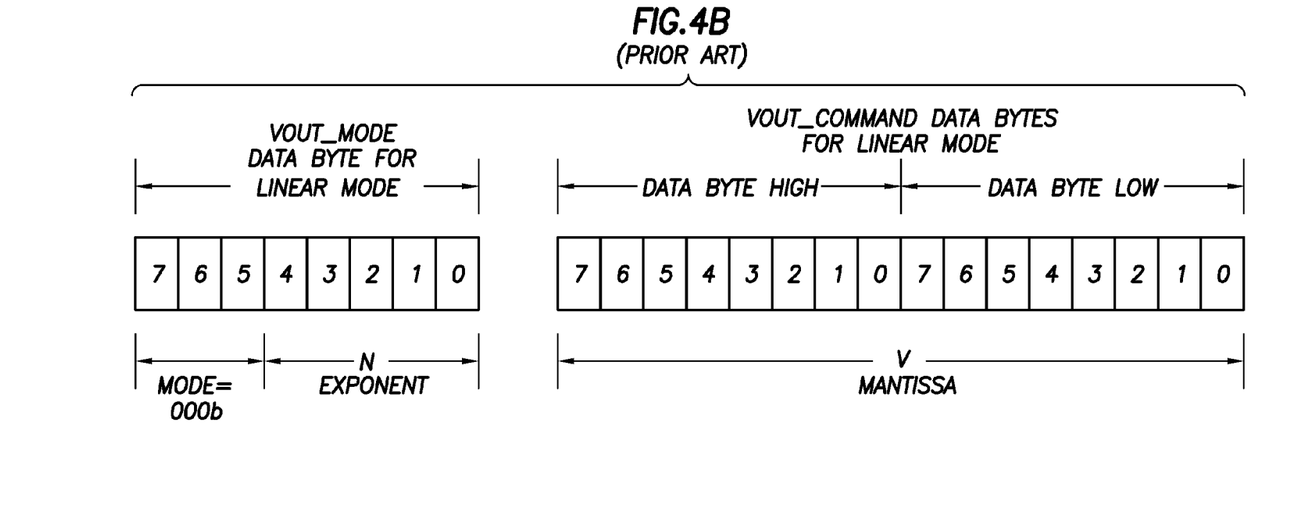

The data bytes for commanding and reporting parameters may require 3 bytes when using the linear voltage data format. FIG. 4B illustrates the format of the three data bytes. One data byte is an output voltage mode command byte that is sent separately from the other two data bytes for the output voltage-related command. The output voltage mode command byte consists of bits 0-4 for the exponent (N) and bits 5-7 for the mode. The output voltage mode command byte is sent only when the format of the output voltage changes. The data bytes for the output voltage-related command consist of a low byte and high byte that correspond to the mantissa (V). The voltage may be represented by the equation: $voltage=V*2^N$. Thus, the linear data formats for PMBus require 2-3 bytes for every value.

As most sensors are only applicable in a limited value range, or are very slowly changing, the following metrological primitives are provided to minimize the interface bandwidth and latency.

Delta Time—Return time from last Mark

Mark Time—Subsequent sensor access provides Delta Time from last Mark

Figure 5A:
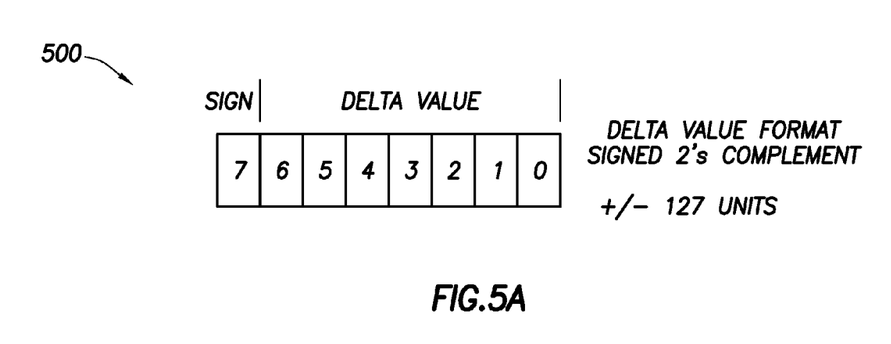
FIG. 5A illustrates a delta value format, in accordance with certain embodiments of the present disclosure.

Set Magnitude Base Per Sensor (mV, V, µA, mA, A)—Value return is based on magnitude resolution Delta Value—Return value difference from last time sensor was read FIGS. 5A-D show corresponding primitives formats by way of example without limitation. FIG. 5A depicts an example delta value format, generally indicated at 500. A single byte may provide the necessary range and resolution, versus the 2-3 bytes required by the in the existing art. The delta value format, in signed 2's complement, may provide for +/−127 units. Bits 0-6 may be provided for the Delta Value and bit 7 may be provided for the sign.

Figure 5B:
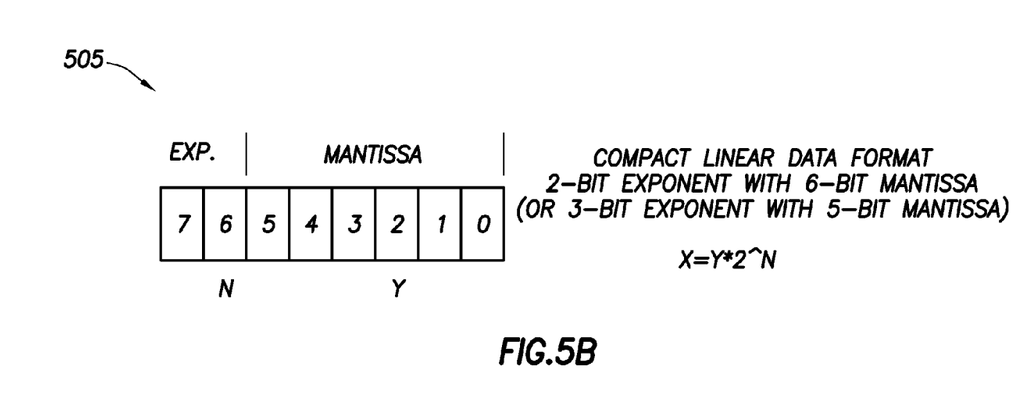
FIG. 5B illustrates a compact linear data format, in accordance with certain embodiments of the present disclosure.

FIG. 5B depicts an example compact linear data format, generally indicated at 505. The compact linear data format may provide for a 2-bit exponent with a 6-bit mantissa, as depicted. Bits 0-5 may be provided for the mantissa (Y); bits 6 and 7 may be provided for the exponent (N), such that $X=Y*2^N$. In an alternative not shown, the compact linear data format may provide for another delineation such as a 3-bit exponent with a 5-bit mantissa.

Figure 5C:
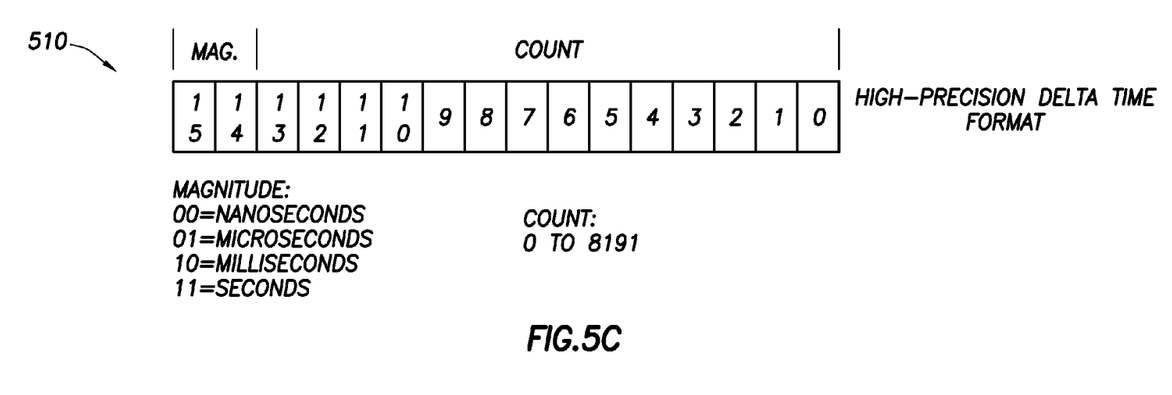
FIG. 5C illustrates a high-precision delta time format, in accordance with certain embodiments of the present disclosure.

FIG. 5C depicts an example high-precision delta time format, generally indicated at 510. The high-precision delta time format may provide bits 0-13 for a count with a range of 0 to 8,191 units. Bits 14 and 15 may be provided for the magnitude. As depicted, the magnitude may provide a scale from the nanoseconds to seconds, for example.

Figure 5D:
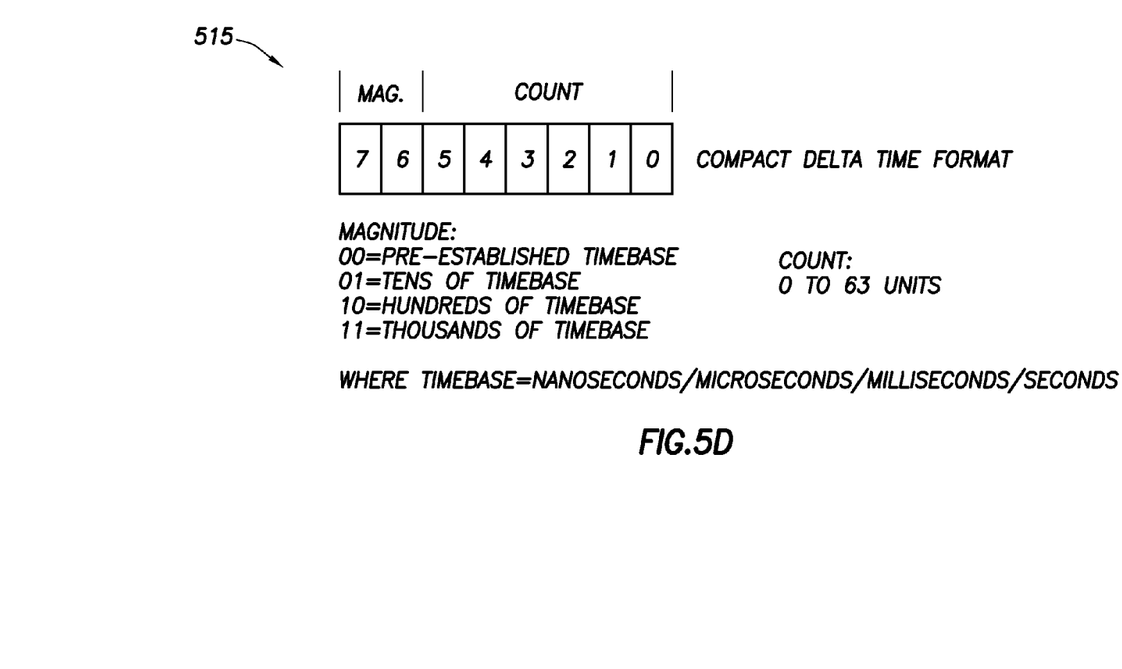
FIG. 5D illustrates a compact delta time format, in accordance with certain embodiments of the present disclosure.

FIG. 5D depicts an example compact delta time format, generally indicated at 515. The compact delta time format may provide bits 0-5 for a count with a range of 0 to 63 units. Bits 6 and 7 may be provided for the magnitude. As depicted, the magnitude may provide a scale from a pre-selected time base to orders of magnitude of ten, hundred and thousand, for example. The time base, for example, may be nanoseconds, microseconds, milliseconds, or seconds. Initializing via "Magnitude Base Per Sensor" may reduce required data handling.

The telemetric and metrological primitives of the present disclosure may be used for management of multiple sensors. A few of the myriad possible non-limiting examples may include: setting time base to X; setting magnitude to amperes; reading AC current with timestamp when last sampled; taking a new sample of voltage X milliseconds after receiving the command; adjusting time base by +5.321 milliseconds; reading temperature with timestamp; capturing AC waveform when time base=X Bus with sensor data timestamps.

Thus, the present disclosure provides systems and methods for system-wide and system-to-system time and data synchronization for power management interfaces and sensors. These systems, formats, and methods may reduce power management interface bandwidth and latency. Disclosed methods may be used to maintain synchronization, and commands for controls and telemetry may return data with absolute and/or relative time. A power management agent may correlate return data and/or schedule/coordinate power control changes. With the fine-grained time synchronized power telemetry disclosed herein, usage models, such as charging power utilization to virtual machines and real-time performance/Watt optimization, may be supported. While certain examples herein are disclosed in view of the PMBus protocol, certain embodiments may be applicable to all similar interfaces. Additionally, certain embodiments may be integrated and/or adapted with various known protocols to facilitate system-system time and data synchronization that may allow system-system clocks to be maintained to one millisecond or better. Other technical advantages will be apparent to those of ordinary skill in the art in view of the specification, claims and drawings.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an" as used in the claims are each defined herein to mean one or more than one of the element that it introduces.

What is claimed is:

1. A power management control system for an information handling system, the power management control system comprising:
   a power management interface bus interfacing a plurality of devices, wherein one or more of the devices is each associated with a time clock; and
   a management agent interfacing the power management interface bus, wherein the management agent comprises a program executing on one or more controllers, wherein the management agent is configured to:
   receive a system time;
   synchronize the one or more time clocks based, at least in part, on the system time;
   maintain synchronization of the one or more time clocks, at least in part, via a set of telemetric primitives, wherein the set of telemetric primitives includes at least one of write time to one or more nodes, adjust time by a value, read time, read supported time base precision and mark time; and
   wherein the one or more of the devices comprises at least two devices, and wherein the management agent is further configured to synchronize the one or more time clocks based, at least in part, on a calibrated responder associated with one of the devices.

2. The power management control system of claim 1, wherein the management agent is further configured to maintain synchronization of the one or more time clocks based, at least in part, on timestamp information received via the power management interface bus.

3. The power management control system of claim 1, wherein the management agent is further configured to maintain synchronization of the one or more time clocks, at least in part, with one or more of a delta value format, a compact linear data format, a high-precision delta time format, and a compact delta time format.

4. A method for providing a power management control system for an information handling system, the method comprising:
   providing a power management interface bus interfacing a plurality of devices, wherein one or more of the devices is each associated with a time clock;
   providing a management agent interfacing the power management interface bus, wherein the management agent comprises a program executing on one or more controllers, wherein the management agent is configured to receive a system time;
   synchronizing the one or more time clocks based, at least in part, on the system time;
   maintaining synchronization of the one or more time clocks, at least in part, via a set of telemetric primitives, wherein the set of telemetric primitives includes at least one of write time to one or more nodes, adjust time by a value, read time, read supported time base precision, and mark time; and
   wherein the one or more of the devices comprises at least two devices, and wherein the management agent is further configured to synchronize the one or more time clocks based, at least in part, on a calibrated responder associated with one of the devices.

5. The method of claim 4, further comprising:
   maintaining synchronization of the one or more time clocks based, at least in part, on timestamp information received via the power management interface bus.

6. The method of claim 4, further comprising maintaining synchronization of the one or more time clocks, at least in part, with one or more of a delta value format, a compact linear data format, a high-precision delta time format, and a compact delta time format.

7. A method for providing system-wide time synchronization across power management interfaces, the method comprising:
   providing a set of primitives to a controller to retrieve and control time information, at least in part, with one or more of the primitives, wherein the time information is associated with a plurality of devices coupled to a power management interface bus, and wherein one or more of the devices is each associated with a time clock;
   providing a set of telemetric primitives to the controller to synchronize the one or more time clocks based, at least in part, on one or more of the telemetric primitives and timestamp information received via the power management interface bus, wherein the telemetric primitives include at least one of write time to one or more nodes, adjust time by a value, read time, read supported time base precision, and mark time; and
   maintaining synchronization of the one or more time clocks based, at least in part, on timestamp information received via the power management interface bus.

8. The method of claim 7, further comprising configuring the controller to support data transfer via one or more of a delta value format, a compact linear data format, a high-precision delta time format, and a compact delta time format.

9. The method of claim 8, further comprising:
   maintaining synchronization of the one or more time clocks, at least in part, with one or more of a delta value format, a compact linear data format, a high-precision delta time format, and a compact delta time format.

* * * * *